(12) United States Patent
Kubinski

(10) Patent No.: US 9,745,909 B2
(45) Date of Patent: Aug. 29, 2017

(54) RADIO FREQUENCY CONTROL OF AIR-FUEL RATIO

(71) Applicant: Ford Global Technologies, LLC, Dearborn, MI (US)

(72) Inventor: David John Kubinski, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 146 days.

(21) Appl. No.: 14/872,588

(22) Filed: Oct. 1, 2015

(65) Prior Publication Data

US 2017/0096956 A1 Apr. 6, 2017

(51) Int. Cl.
| | |
|---|---|
| *F01N 3/00* | (2006.01) |
| *F02D 41/02* | (2006.01) |
| *F02D 41/14* | (2006.01) |
| *F01N 3/20* | (2006.01) |

(52) U.S. Cl.
CPC ....... *F02D 41/0245* (2013.01); *F01N 3/2066* (2013.01); *F02D 41/1477* (2013.01)

(58) Field of Classification Search
CPC ............... F01N 3/2066; F01N 2560/12; F01N 2900/1624; F01N 2430/06; F02D 41/0245; F02D 41/1477
See application file for complete search history.

(56) References Cited

U.S. PATENT DOCUMENTS

| | | | |
|---|---|---|---|
| 7,679,374 B2 | 3/2010 | Bromberg et al. | |
| 2013/0199161 A1* | 8/2013 | Aisaka | F01N 3/0864 60/276 |
| 2013/0255228 A1* | 10/2013 | Sakamoto | F01N 11/00 60/274 |
| 2014/0283503 A1* | 9/2014 | Roesch | G01N 22/00 60/274 |

(Continued)

FOREIGN PATENT DOCUMENTS

EP 2 021 813 B1 8/2014

OTHER PUBLICATIONS

Moos, R. et al., "TWC: Lambda Control and OBD without Lambda Probe—An Initial Approach," SAE Technical Paper Series 2008-01-0916, Copyright 2008, 8 pgs.

(Continued)

*Primary Examiner* — Jesse Bogue
(74) *Attorney, Agent, or Firm* — Damian Porcari; Brooks Kushman P.C.

(57) ABSTRACT

Methods are disclosed for determining an oxidation state of a catalyst using RF signals. The method may include introducing radio-frequency signals into a resonant chamber including a catalyst, modulating an air-fuel ratio of an engine upstream of the catalyst to generate a sequence of uniform pulses and at least one altered pulse that differs from the uniform pulses, and comparing a frequency response of two or more resonant modes of the radio-frequency signals during the sequence to determine an oxidation state of the (Continued)

catalyst. The method may further include adjusting the air-fuel ratio based on the comparing step. Two or more altered pulses may be inserted into the air-fuel ratio sequence. The altered pulse may have a pulse width and/or amplitude that differs from the uniform pulses. The methods may be used to adjust an air-fuel ratio to correct or impart a bias.

20 Claims, 15 Drawing Sheets

(56) References Cited

U.S. PATENT DOCUMENTS

2016/0265414 A1* 9/2016 Devarakonda ........ F01N 13/009
2016/0273437 A1* 9/2016 Devarakonda ........ F01N 11/002

OTHER PUBLICATIONS

Moos, R. et al., "Direct Catalyst Monitoring by Electrical Means: An Overview on Promising Novel Principles," Top Catal (2009) 52:2035-2040.

* cited by examiner

RADIO FREQUENCY CONTROL OF AIR-FUEL RATIO

TECHNICAL FIELD

The present disclosure relates to control of the air-fuel ratio, for example, using radio frequency electrical signals.

BACKGROUND

Control of the air-fuel (A/F) ratio ($\lambda$) of the exhaust gas entering an automotive catalyst, such as a three-way catalyst (TWC), may be necessary for optimal conversion of unwanted tailpipe emissions. The conversion of emissions such as nitrogen oxides (NOx), hydrocarbons (HC), and CO may all be affected by the A/F ratio. If the A/F ratio is not controlled properly, unwanted emissions may escape from a vehicle. In order to accurately control the A/F ratio, sensors or other detection devices may be placed up and/or downstream of the catalyst. However, this equipment may not always be accurate/calibrated and may experience changes over time or from environmental conditions.

SUMMARY

In at least one embodiment, a method is provided. The method may include introducing radio-frequency signals into a resonant chamber including a catalyst; modulating an air-fuel ratio of an engine upstream of the catalyst to generate a sequence of uniform pulses and at least a first altered pulse that differs from the uniform pulses; and comparing a frequency response of two or more resonant modes of the radio-frequency signals during the sequence to determine an oxidation state of the catalyst.

The sequence may include two altered pulses. In one embodiment, one altered pulse may begin with a lean portion and another altered pulse may begin with a rich portion. The first altered pulse may have a pulse width that is greater than a pulse width of the uniform pulses and/or the first altered pulse may have a pulse amplitude that is greater than a pulse amplitude of the uniform pulses. In one embodiment, an average air-fuel ratio of the altered pulse is the same as an average air-fuel ratio of the uniform pulses. The two or more resonant modes may be chosen from a group consisting of $T_{111}$, $T_{112}$, $T_{113}$, $T_{114}$, and $T_{115}$. The comparing step may include comparing a frequency response of at least three resonant modes during the sequence. Determining an oxidation state of the catalyst may include determining if the catalyst is fully oxidized, fully reduced, oxidized with a rich bias, or reduced with a lean bias. The method may further include adjusting the air-fuel ratio based on the comparing step.

In at least one embodiment, a method is provided. The method may include introducing radio-frequency signals into a resonant chamber including a catalyst; inserting an altered pulse into a sequence of uniform pulses of an air-fuel ratio of an engine upstream of the catalyst; comparing a frequency response of two or more resonant modes of the radio-frequency signals during the sequence to determine an oxidation state of the catalyst; and adjusting the air-fuel ratio based on the comparison.

In one embodiment, if the comparing step determines that there is a lean bias in the catalyst, the adjusting step includes one or more of reducing a lean portion time in the sequence, increasing a rich portion time in the sequence, injecting more fuel during a rich portion in the sequence, or injecting more fuel during a lean portion in the sequence. In another embodiment, if the comparing step determines that there is a rich bias in the catalyst, the adjusting step includes one or more of increasing a lean portion time in the sequence, decreasing a rich portion time in the sequence, injecting less fuel during a rich portion in the sequence, or injecting less fuel during a lean portion in the sequence.

The inserting step may include inserting two altered pulses into the sequence. One altered pulse may begin with a lean portion and another altered pulse may begin with a rich portion. The altered pulse may have a pulse width that is greater than a pulse width of the uniform pulses or a pulse amplitude that is greater than a pulse amplitude of the uniform pulses.

In at least one embodiment, a method is provided. The method may include introducing radio-frequency signals into a resonant chamber including a catalyst to generate multiple resonant modes in the resonant chamber; modulating an engine air-fuel ratio upstream of the resonant chamber to generate a sequence of pulses including multiple uniform pulses and two altered pulses in the resonant chamber; and measuring and comparing a frequency response of two or more of the multiple resonant modes to determine an oxidation state of the catalyst.

In one embodiment, the two altered pulses have a pulse width that is greater than a pulse width of the uniform pulses or a pulse amplitude that is greater than a pulse amplitude of the uniform pulses. The modulating step may include generating three or more altered pulses in the sequence. One altered pulse may begin with a lean portion and another altered pulse may begin with a rich portion.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
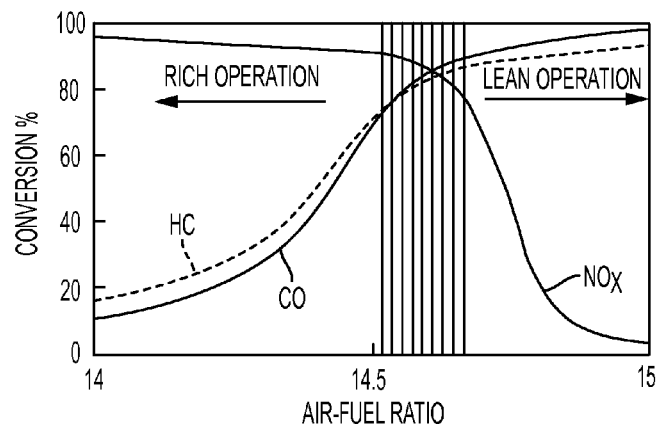
FIG. 1 is an example of a plot showing the conversion efficiency for NOx, hydrocarbons, and carbon monoxide vs. the air-fuel (A/F) ratio.
Figure 2:
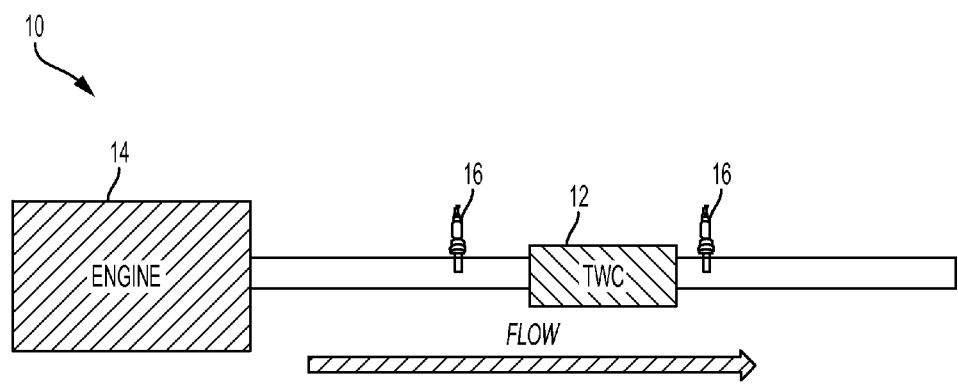
FIG. 2 is a schematic of an oxygen sensor placement in an exhaust system, according to an embodiment.
Figure 3:
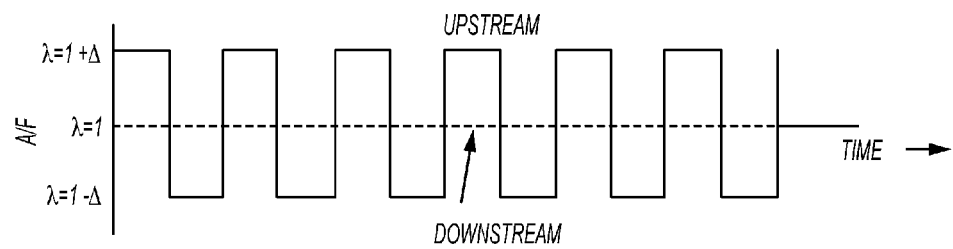
FIG. 3 is a schematic of upstream and downstream A/F modulation about $\lambda=1$, according to an embodiment.

As seen in FIG. 1, simultaneous conversion of nitrogen oxides (NOx), hydrocarbons (HC), and CO may be achieved only in a narrow window in the A/F about $\lambda=1$. Control of the modulation of the air-fuel (A/F) ratio ($\lambda$) about $\lambda=1$, which may be necessary for optimal emissions conversion over the TWC, is generally achieved via feedback from oxygen sensors placed both upstream and downstream of the TWC. FIG. 2 shows a typical arrangement of a system 10 including a three-way catalyst 12 downstream of an engine 14 and the oxygen sensors 16 upstream and downstream of the TWC 12. FIG. 3 shows a schematic of the air-fuel ratio over time as detected upstream and downstream of the TWC. The "upstream" A/F ratio may be modulated in time about $\lambda=1$. Optimal gas conversions (e.g., of NOx, HCs, and CO) may be achieved when the downstream oxygen sensor detects a stable gas concentration, around $\lambda=1$, but without the A/F modulation as seen by the upstream oxygen sensor.

The TWC may achieve this through the use of an oxygen storage component, such as cerium oxide (e.g., $CeO_2$), which is able to easily change its oxidation state and act as a source or sink for oxygen in the desired chemical reactions. For example, an oxidized portion of this storage material may aid in the oxidation of the reductants (HCs, CO, $H_2$) during the rich portion of the A/F modulation, and a partially reduced portion may aid in the reduction of NOx to $N_2$ during the lean intervals. To achieve optimal conversion, it may also be important to minimize shifts in the A/F bias (the time averaged A/F value). Drifts in the A/F control may occur due to inaccuracies in the response of the sensors and/or in the fuel injectors. Fine-tune adjustments to the A/F control can be made by the oxygen sensor placed downstream of the TWC. For example, an unwanted lean bias may cause the oxygen storage material to be oxidized to a high degree and eventually result in a lean shift in the response of the downstream oxygen sensor. This may lead to unwanted NOx emissions. Similarly, an unwanted rich bias may eventually reduce the oxygen storage material of the TWC resulting in a rich shift in the downstream oxygen sensor and unwanted hydrocarbon and CO emissions. The bias in the A/F modulation can be described as a variation between $\lambda=1-\Delta+\delta \rightarrow \lambda=1+\Delta+\delta$, with $|\delta|<|\Delta|$. For no bias, $\delta=0$.

One of the potential issues that may result from using a downstream oxygen sensor as feedback for A/F control is that it can only detect unwanted shifts in the time-averaged A/F value after the unwanted gas-emissions occur. Increased A/F sensitivity of the sensor can minimize these emissions, but these undesirable emissions are the very quantity that the oxygen sensor is detecting. To address this issue, a method using a radio frequency (RF) microwave technique has been developed that can detect directly and in situ the oxygen storage state of the TWC. This may enable the possibility of eliminating the breakthrough of unwanted gases downstream of the catalyst, since changes in the oxidation state of the catalyst may be detected before the unwanted emissions occur.

Figure 4:
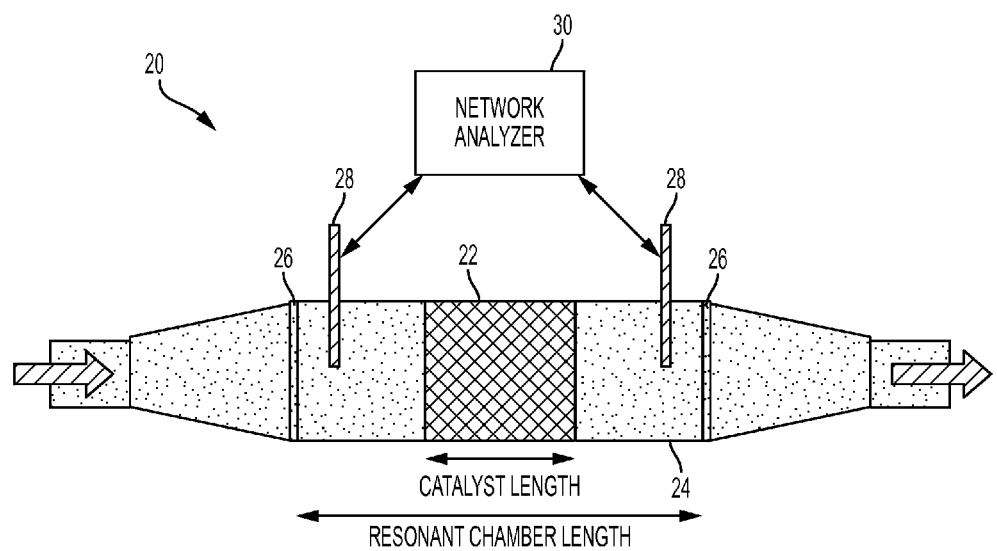
FIG. 4 is an schematic example of an radio-frequency (RF) signals generation and detection configuration in a vehicle exhaust system, according to an embodiment.

The RF technique may include monitoring the electromagnetic radiation in a resonator cavity, an example of which is shown in FIG. 4. The RF system 20 may include a catalyst 22 (e.g., TWC) placed within a metallic resonator cavity 24, generally a tube with end faces being a metallic mesh screen 26 which allows gas flow but which contain and reflect the electromagnetic energy. A single electrically isolated metal antenna 28 may be placed either upstream or downstream of the catalyst, or two antennas 28 may be placed with one upstream and one downstream of the catalyst 22. Other configurations and/or number of antennas may also be used.

Radio frequency electrical signals (e.g., from 3 kHz to 300 GHz) may be sent and detected by the antenna(s) 28. This may be accomplished by an instrument known as a network analyzer 30, which may be electrically connected to one or both antennas. The network analyzer 30 is an instrument which may be configured to measure the electrical network scattering parameters. It may do so by transmitting and analyzing the amplitude and phase of reflected and/or transmitted signals over a range of frequencies. If there is a single antenna 28, the network analyzer 30 may send and vary the frequency of the signal to it, detecting the reflected energy returning. If there are two (or more) antennas 28, the network analyzer 30 may detect the transmitted energy through the catalyst 22. For various frequencies, natural electromagnetic resonances occur within the cavity, which may be subsequently detected in the reflected energy. The resonant frequencies may be a function of the cavity geometry and the dielectric properties of the materials placed within it.

By focusing on frequencies near the electromagnetic resonances, this technique may offer a sensitive method for monitoring changes in the dielectric properties of the catalyst. Physical changes within the catalyst, for example a reduction in the oxidation state of ceria in a TWC upon a lean to rich gas transition, may result in large changes in the dielectric properties of the catalyst. The changes in the dielectric properties may affect the speed and wavelength of the electromagnetic radiation, which may result in a frequency shift of the resonant mode. This frequency shift may be detected by the network analyzer 30, thereby providing a non-contacting and in-situ method for tracking changes in the state of the catalyst.

Figure 5:
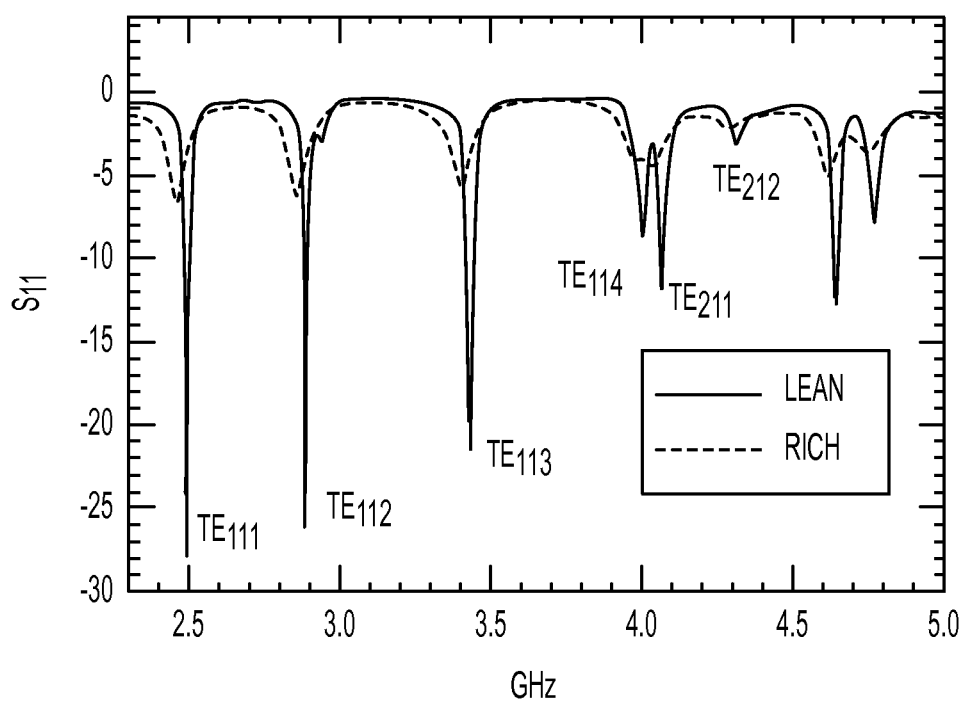
FIG. 5 is an example of a plot showing reflected modes detected in a resonant cavity containing a three-way catalyst (TWC)

Examples of the resonant modes seen in a frequency scan of a cavity containing a TWC are shown in FIG. 5. This data, and the remaining data shown herein, are for a one antenna system which generates electromagnetic signals and detects the reflected energy. The downward spikes in the data are the frequencies at which resonance occurs and are labeled by the designation $TE_{lmn}$, with the last factor "n" being the number of half wavelengths along the axial dimension of the resonator cavity. The solid line is for long exposure in a "lean" gas with excess oxygen, resulting in fully oxidized ceria in the TWC. The dashed line is for long exposure in a "rich" gas with insufficient oxygen to combust the reductants, resulting in reduced ceria in the TWC. A plot of the frequency of the $TE_{lmn}$ resonant modes with time demonstrates the resonances will shift downward to a lower frequency and have a lower intensity upon a lean to rich gas change.

Figure 6A:
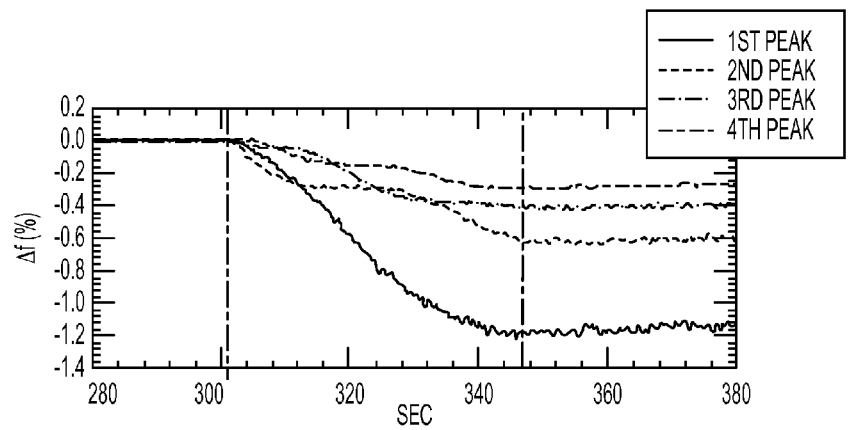
FIG. 6A is an example of a plot showing a change in resonant frequency over time for several resonant modes.
Figure 6B:
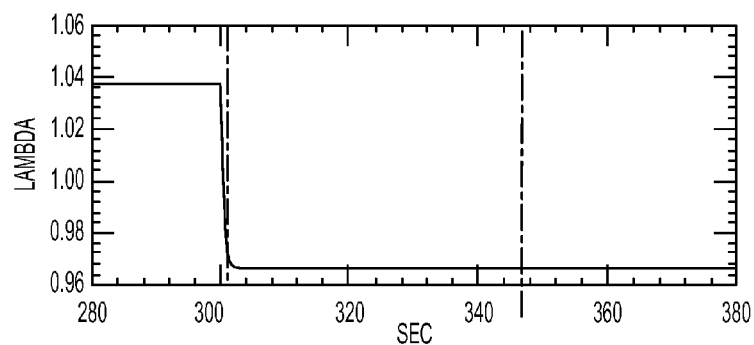
FIG. 6B is an example of a plot showing a step transition from a lean to rich A/F ratio.
Figure 6C:
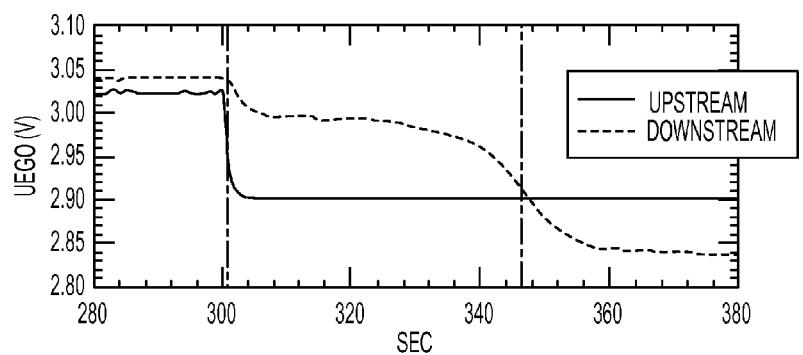
FIG. 6C is an example of a plot showing oxygen levels upstream and downstream of the TWC during the step transition of FIG. 6B.

FIG. 6 demonstrates the shift in frequency with time for some of the resonant modes during a lean to rich gas step ($\lambda$=1.036 to $\lambda$=0.965) which occurred at t=300 sec (FIG. 6B). The downstream Universal Exhaust Gas Oxygen (UEGO) ($O_2$) gas sensor (FIG. 6C) shows that it took about 50 seconds for the rich gas to fully break through downstream of the catalyst as it took that long to reduce the ceria in the TWC. In FIG. 6A, the corresponding $TE_{11n}$ modes (n=1, 2, 3, 4) show decreases in frequency with time ($\Delta f \%$ is the fractional change in frequency from the starting lean state), albeit each mode changing by varying fractional amounts and rates with time. The resonant frequency for each mode stops changing near the time when the downstream UEGO sensor indicates the oxygen storage in the TWC has been consumed.

Figure 7A:
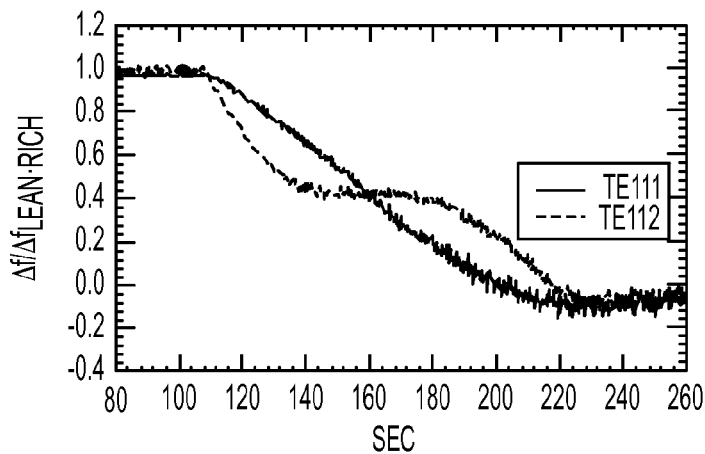
FIG. 7A is an example of a plot showing normalized frequency variation with time for a lean to rich transition in two resonant modes.
Figure 7B:
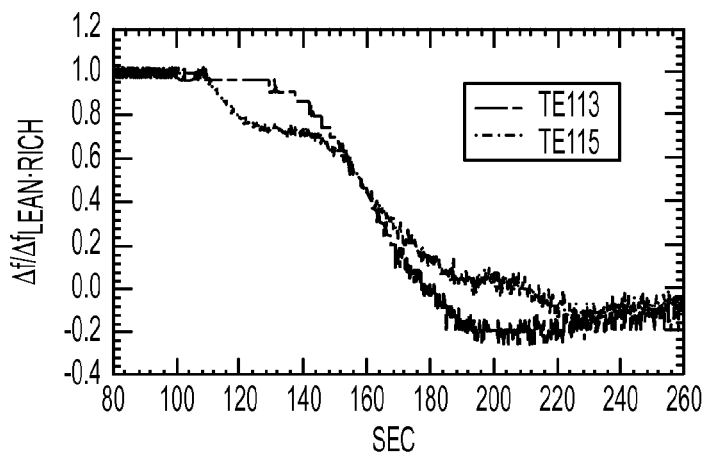
FIG. 7B is an example of a plot showing normalized frequency variation with time for a lean to rich transition in two additional resonant modes.
Figure 7C:
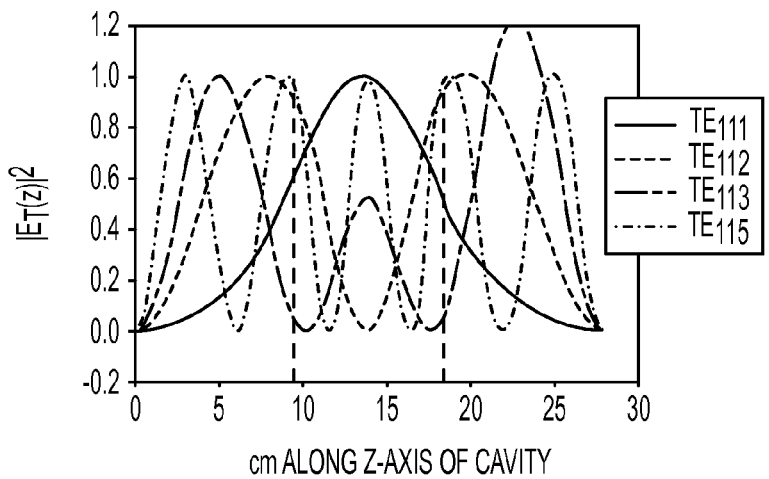
FIG. 7C is a plot of modeled values of the electric field squared for the modes shown in FIGS. 7A and 7B along the cavity z-axis.

Another comparison of the frequency changes with time for the $TE_{11n}$ modes is shown in FIG. 7 for a lean to rich gas step starting near t≈110 sec. In FIG. 7, the data has been normalized such that the value 1 represents the starting frequency in the lean state and 0 the ending frequency in the rich state. The plots in FIGS. 7A-7C demonstrate that the normalized frequency changes at different rates for the individual modes. For example, the frequency of $TE_{111}$ resonant mode decreases almost linearly with time starting near t≈110 sec until it reaches its ending frequency (with the ceria reduced) near t≈220 sec. Comparatively, the relative response of the $TE_{112}$ mode is different as there is a time interval from about 150 to 180 seconds during which the $TE_{112}$ mode changes little with time. During this same time period, however, the $TE_{111}$ is decreasing at almost a constant rate. These comparative variations in the resonant frequency changes may be used to better determine the location where changes in the oxidation state of the ceria component of the TWC occur.

It is believed that the reason for the variation in relative sensitivities between the resonant modes is offered in FIG. 7C. Here, $|E_T(z)|^2$ is plotted for several $TE_{11n}$ modes as a function of the axial distance along the resonator cavity. $|E_T(z)|^2$ is the square of the axial component (z-direction) of transverse electric field and it is known that the changes in the resonant frequency depend on the product of this quantity and local changes in the dielectric properties (for example by changes in the catalyst's oxidation state). This field goes to zero at the cavity ends (e.g., at z=0 cm and z=~28 cm in FIG. 7). The field also goes to zero for some of the modes at other places within the cavity. For example, the $TE_{112}$ mode has a zero value near the mid position along the cavity axis. It has been discovered that changes in the catalyst properties in a region where the axial component of the electric field is zero will not result in changes to the resonant frequency. Therefore, by proper positioning of the catalyst within the resonator cavity, resonant modes can be set up which have reduced sensitivity in desired locations. This may enable, by comparison to the responses of the other modes, a determination of where changes in the catalyst are occurring.

Figure 8:
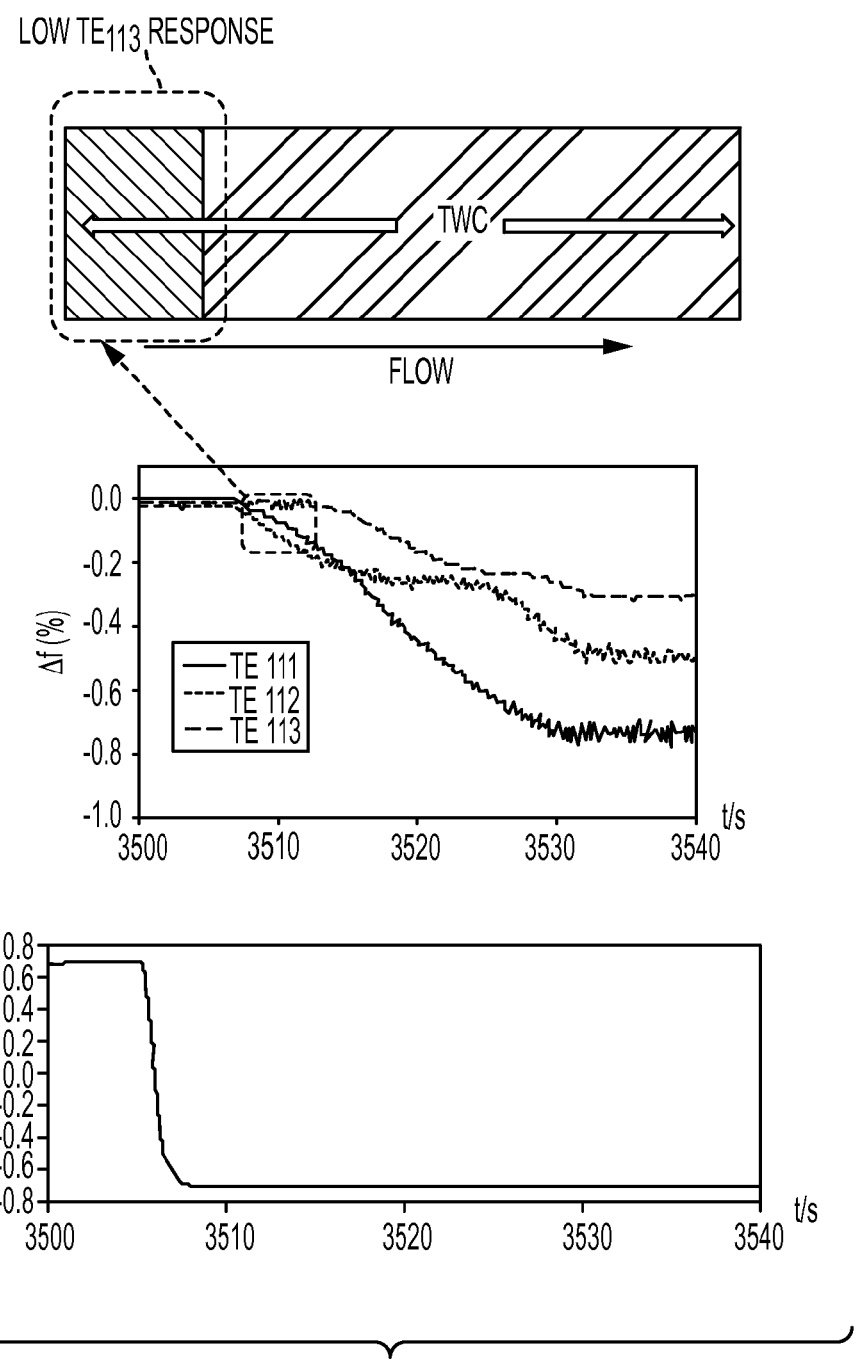
FIG. 8 is an example of a plot showing the responses of several resonant modes to a single lean to rich step, including a region where one mode has low sensitivity.
Figure 9:
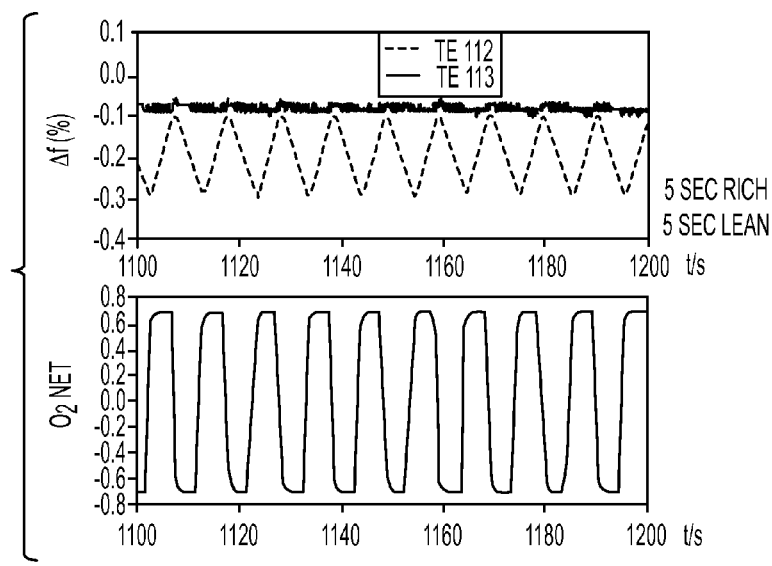
FIG. 9 is an example of a plot comparing two resonant modes during alternating lean and rich periods showing the one is sensitive while the other is not.
Figure 10:
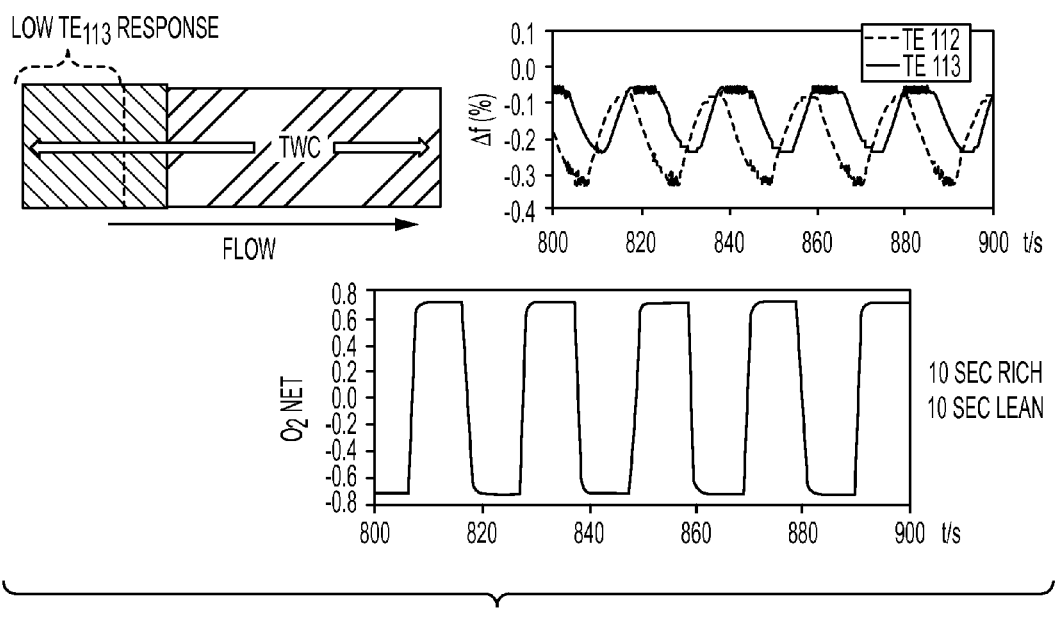
FIG. 10 is an example of a plot comparing two resonant modes during longer alternating lean and rich periods showing that both modes are sensitive.

A comparison of the relative responses of the RF modes may yield information about where changes in the catalyst occur. For example, FIGS. 8-10 show the relative responses of lean-rich gas pulses of different durations. In FIG. 8, the response to a single, long duration lean to rich gas step is shown (+0.7%→−0.7% net $O_2$). The relative changes in the resonant modes with time are consistent with an almost step-like boundary separating the newly reduced and previously oxidized portions in the catalyst that is moving through it linearly in time. In FIG. 9, the changes in the $TE_{112}$ and $TE_{113}$ modes to alternating 5 second lean and 5 second rich gas pulses (±0.7% net $O_2$) are shown. The lack of a response for the $TE_{113}$ mode indicates that the changes to the oxidation state of the catalyst (due to the A/F modulations) are occurring in the front region (shown in red) where there is little to no response for the $TE_{113}$ mode. FIG. 10 confirms this, as here the duration of the lean and rich pulses was doubled to 10 seconds. For this case, the changes to the oxidation state of the ceria in the catalyst (shown in red) extend beyond the zone where the response to the $TE_{113}$ mode is minimal, and a much larger relative $TE_{113}$ response is observed. Thus, by comparison of the relative response of the modes coupled with knowledge of the expected electric field distribution within the catalyst, it can be determined where along the catalyst axis length the reactions to the lean-rich gas pulses occur.

In addition to monitoring the relative differences in the responses of the resonant modes to determine where within the catalyst the ceria reactions occur, the response of one of the modes to deduce the average ceria oxidation state within the catalyst can be examined. For this, the $TE_{111}$ mode may be used (although others may, as well). As shown in FIG. 6, this mode shows nearly linear change with time as a fully oxidized catalyst is reduced by a rich gas step. Knowledge of the resonant frequencies when the catalyst is fully oxidized (e.g., before t=300 sec in FIG. 6) and when it is fully reduced (e.g., after t=360 sec in FIG. 6) may allow for a determination of the average oxidation state of the catalyst. For example, a measured frequency midway between fully oxidized and fully reduced may indicate that, on average, the oxygen storage in the catalyst has been reduced 50% (e.g, from the lean state). However, use of one resonant frequency value alone cannot say how the oxygen storage is distributed along the catalysts' axis (e.g., if the front half is reduced and the back half is oxidized).

The above-described multimode RF signals may be used to measure and control the oxygen storage on TWCs. This technique may offer a potential advantage when used together with existing oxygen sensors in detecting unwanted bias in the air/fuel perturbation about λ=1 before unwanted emissions occur downstream of the TWC. This can be accomplished by correlating the measured resonant frequency(ies) with an oxygen loading state on the TWC. However, one potential problem is that the resonant frequencies of each mode may drift with temperature. Another potential problem is that the total oxygen storage of the catalyst can change with time (e.g., "aging") and, consequently, the resonant frequencies in both its full and depleted oxygen storage state. The resonant frequencies may also drift due to small perturbations in the reflecting surfaces of the resonant chamber. The relative responses to symmetric in amplitude and duration lean/rich gas pulses show that the reactions occur within the front of the catalyst. However, the issues described above may make it difficult to determine the oxidation state of the ceria within the remaining portion of the TWC.

Figure 11:
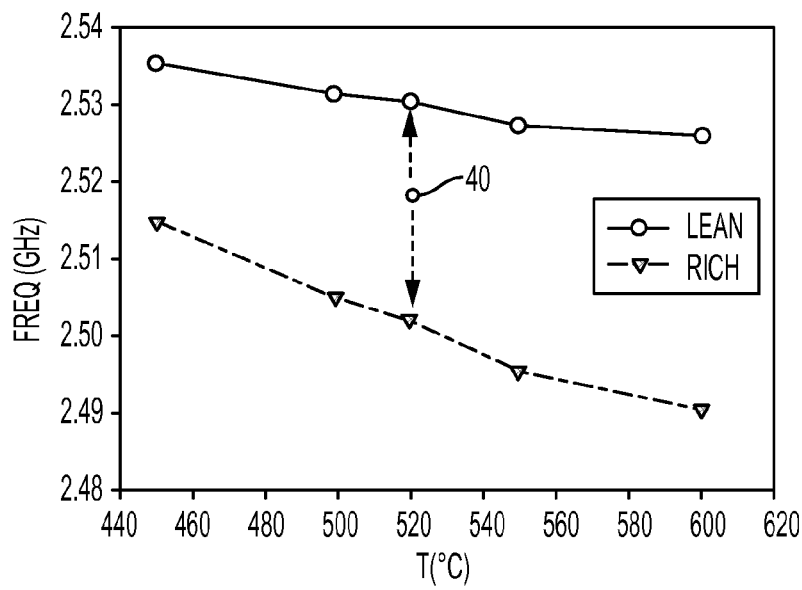
FIG. 11 is an example of a plot showing the changes in resonant frequency with temperature for a single resonant mode in the rich and lean states.

As shown in FIG. 11, the $TE_{111}$ mode resonant frequency decreases with increasing catalyst temperature. Data is shown for both the oxidized case (e.g., when placed in a lean gas for an extended time) and the reduced case (e.g., when in a rich gas for an extended time). Both the lean and rich state frequencies decrease with temperature, and their difference (e.g., lean frequency—rich frequency) increases slightly with temperature over the range shown. In the example shown in FIG. 11, the variation in the reduced state (e.g., rich) frequency over the range 450° C. to 600° C. is comparable to the change from lean to rich at 450° C. The dot 40 at 2.52 GHz and 520° C. represents a state for which the average oxidation state of the ceria is about 50% (assuming a linear variation in frequency from the lean to rich state for the $TE_{111}$ mode). Uncertainties in temperature and knowledge of how the frequencies of both the fully oxidized and fully reduced states change with temperature may result in errors in the estimate of the average oxidation state of the ceria in the TWC.

Figure 12:
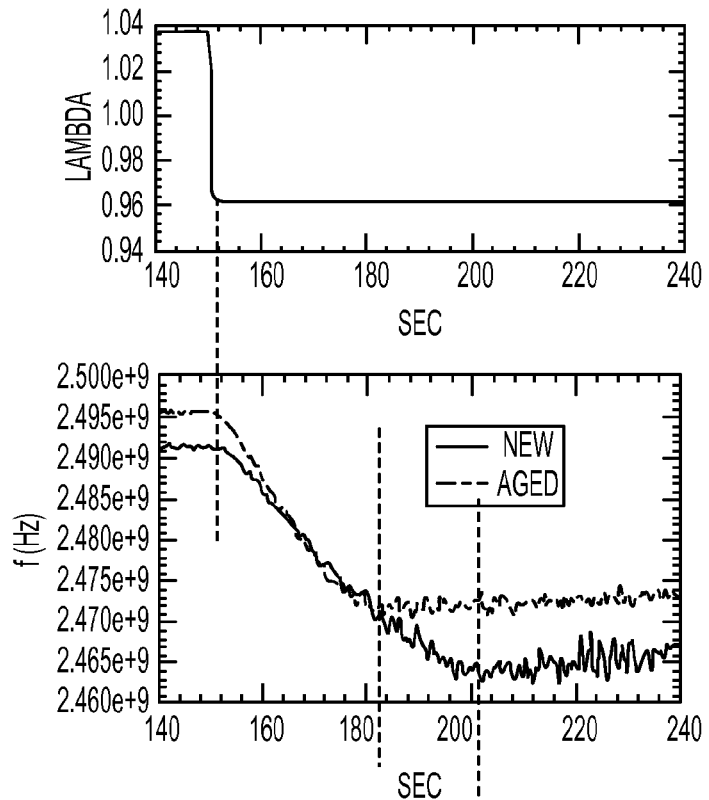
FIG. 12 is an example of a plot showing the impact of catalyst aging on the change in resonant frequency during a lean to rich step.

In addition to changes in resonant frequency with temperature, the total oxygen storage of the catalyst can change with time (aging). This may result in changes to the resonant frequencies in both its full and depleted oxygen storage states. FIG. 12 shows the response of the $TE_{111}$ resonant mode to a lean to rich gas step (λ=1.04→λ=0.96) initiated near t=150 seconds. Data is shown for both a new catalyst (solid) and an oven-aged catalyst (dashed). In the example shown, the oven aged catalyst reaches its reduced state in about 20 seconds less time than the new catalyst, due to having less oxygen storage (less ceria). As the frequencies of the lean state and the reduced state become less certain with aging, so does the knowledge of the oxygen storage capacity (and fractional amount remaining) These effects may complicate the ability to determine both how much oxygen storage has been used and how much remains on the TWC.

In addition to changes due to temperature and aging, the resonant frequencies may also drift due to perturbations in the reflecting surfaces of the resonant chamber. No example is shown, however, it has been shown that the resonant frequencies can be affected by slight changes in the resonant cavity geometry. The frequencies shown in FIG. 11, for example, may be perturbed by warping of the metal screens at the ends of the resonant cavity. While it may be possible to make the resonant cavity geometry more robust or consistent, the issue points to difficulties in the approach of relating the resonant frequency of a specific mode (e.g., the $TE_{111}$) to the ceria oxidation state of the TWC.

The relative responses to the symmetric L/R modulations as seen in FIGS. 8-10 indicate that the oxygen storage reactions due to modulations occur within the front section of the TWC, in the region of low sensitivity for the $TE_{113}$ mode. However, reliable information about the remainder of the catalyst may be complicated by the "noise" factors identified above. The disclosed systems and methods may include introducing one or more unique or altered lean/rich pulses and monitoring the RF response. This may provide information regarding the state of the remaining portion of the catalyst. This technique may not rely on the accuracy of the correlation between resonant frequencies on the average oxidation state of the catalyst, like the approach discussed in with respect to FIG. 11. Instead, the disclosed techniques may rely on the relative variation in frequency between the resonant modes, such as monitoring how the frequency of the modes change relative to each other (e.g., increasing, decreasing or staying constant) during the introduction of the unique or altered A/F pulse(s).

Figure 13:
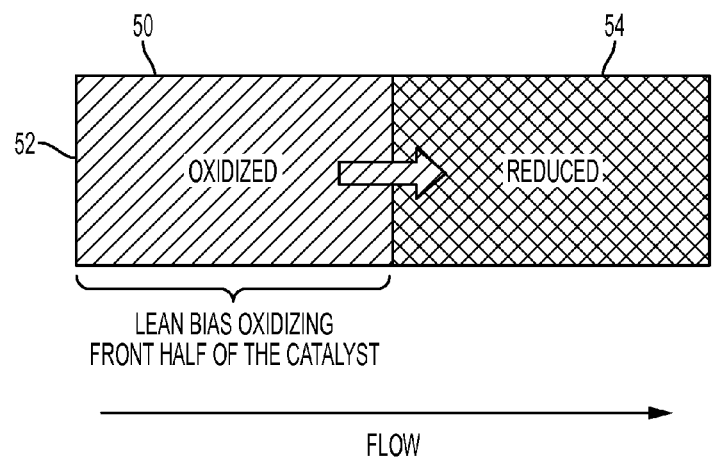
FIG. 13 is a schematic of an oxidation state of the catalyst in which a lean bias is present in the A/F modulation.

An example of the utility of the disclosed techniques may be seen in the TWC oxidation state shown in FIG. 13. In this example, the intended state was a rich gas bias state with the ceria reduced over the entire catalyst length. This may be done to improve NOx emissions, for example. However, in the example shown in FIG. 13, an unknown and unwanted lean bias in the A/F modulation is present. This lean bias may slowly oxidize the catalyst 50 along its axis (e.g., from left to right in the figure). In the example shown in FIG. 13, the oxidized portion 52 covers about the first half of the catalyst, with the reduced portion 54 forming the second half. The RF responses to a nearly symmetric A/F modulation (e.g., with equal in time and magnitude lean and rich pulses) will be similar to that shown in FIG. 9, indicative of the cyclic reaction (due to the cyclic A/F modulation) taking place in the front portion of the catalyst. A drift upwards in the mean frequency of each mode may be indicative of the presence of a lean bias slowly oxidizing the catalyst, however, as described previously, this can be misinterpreted as a temperature decrease (e.g., FIG. 11).

Figure 14:
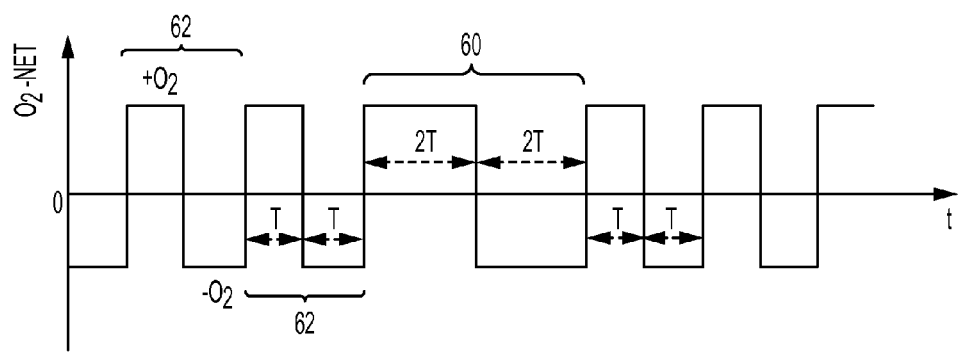
FIG. 14 is a schematic of an A/F modulation sequence including a single, double-wide altered pulse inserted.
Figure 15:
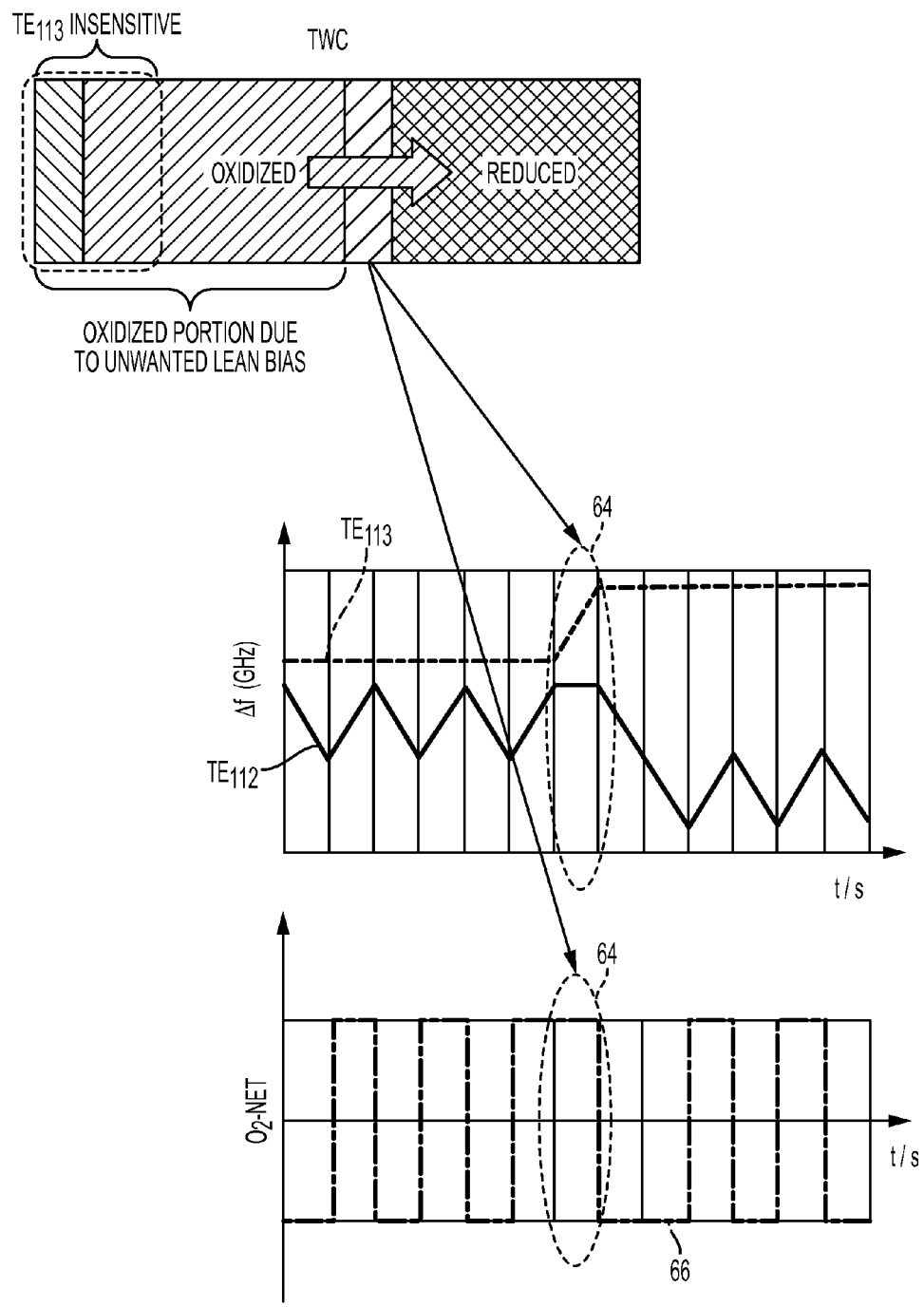
FIG. 15 is an example of a plot showing the relative responses of two resonant modes to a single, double-wide altered pulse, such as shown in FIG. 14.

The disclosed method or technique for determining the presence of the lean bias, e.g., as shown in FIG. 13, may include using a variation in the timing of the A/F pulses as shown in FIG. 14. In the embodiment shown in FIG. 14, a single, double-wide air/fuel modulation pulse 60 is inserted into a stream of symmetric, uniform A/F pulses 62. The duration of each half cycle of the symmetric pulses is shown is T, while the duration of the single, double-wide pulse inserted within it is shown as 2T. With reference to FIG. 15, schematic relative responses of the $TE_{112}$ and $TE_{113}$ modes to the single, double-wide air/fuel pulse placed in a stream of symmetric, uniform A/F pulses are shown. In FIG. 15, the single, double-wide starts lean (e.g., it is lean for 2T then rich for 2T). However, as will be described below, the unique pulse may start rich. Due to the presence of the oxidized front portion of the catalyst, the oxidation of the TWC during the $2^{nd}$ half 64 of the of single, double-wide lean pulse may take place further downstream, at the boundary of the oxidized and reduced regions and in a region where the $TE_{113}$ mode is sensitive. Thus, for this portion only, an increasing step in the frequency response of the $TE_{113}$ mode is observed. As there is little response of the $TE_{112}$ mode in this center region, it shows little response for the second half 64 of the double-wide, single lean pulse. The subsequent double-wide rich pulse 66 reduces the oxidized ceria in the front part of the catalyst, and is seen by the $TE_{112}$ mode and not the $TE_{113}$ mode.

Figure 16:
FIG. 16 is a schematic showing four possible oxidation states of a catalyst.

The disclosed method/technique may be applicable to identifying or distinguishing between numerous catalyst oxidation states. Four general examples cases are shown in FIG. 16. For the purposes of this disclosure, it may be assumed that the front portion of the TWC is alternately reduced and oxidized by the symmetric, uniform lean/rich gas modulation. The four exemplary cases identified herein may describe the remainder of the catalyst past this front region: entire catalyst oxidized, which may be due to a long term lean bias in the A/F modulation (#1, top left); entire catalyst reduced, which may be due to a long term rich bias in the A/F modulation (#2, top right); a rich bias in the A/F modulation reducing a previously oxidized catalyst (#3, bottom left); and a lean bias in the A/F modulation oxidizing a previously reduced brick (#4, bottom right, also shown in FIGS. 13 and 15).

Figure 17:
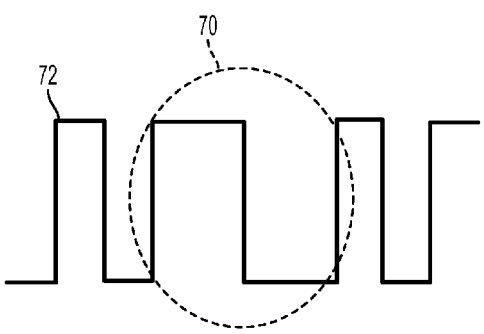
FIG. 17 is a schematic of an A/F modulation sequence including a single, double-wide altered pulse having a first lean portion and a second rich portion.
Figure 18:
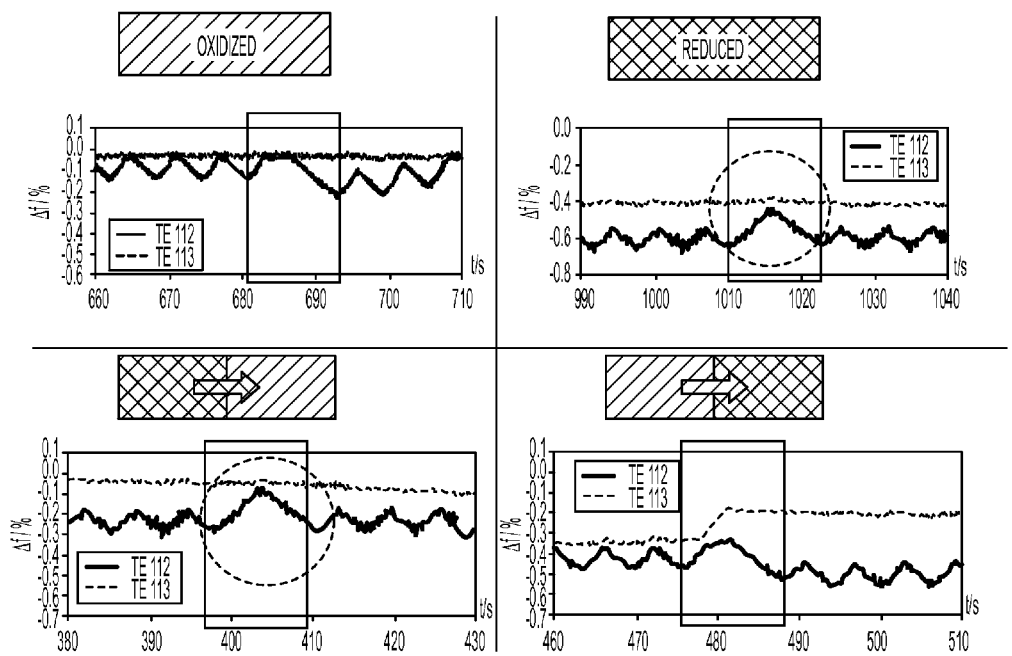
FIG. 18 is an example of a plot showing the resonant mode responses during the sequence in FIG. 17 for two resonant modes for each of the four oxidation states shown in FIG. 16.

FIGS. 17 and 18 show the RF responses for the $TE_{112}$ and $TE_{113}$ modes to a single, double-wide A/F pulse 70 placed in a symmetric, uniform A/F modulation sequence 72. Experimental data is shown for the four cases identified in FIG. 16. The double-wide pulse occurs in the boxed region shown in each figure and the data in this figure is from measurements on a TWC having gas temperature at the inlet of the catalyst of 550° C. For the double-wide single pulse 70 shown in FIG. 17 (which starts lean for 2T then rich for 2T, T being the half period elsewhere) cases #1 and #4 give unique responses, shown in FIG. 18. States #2 and #3 give similar responses (circled), and although different from cases 1 and 4, the responses cannot be used to distinguish between these two.

Figure 19:
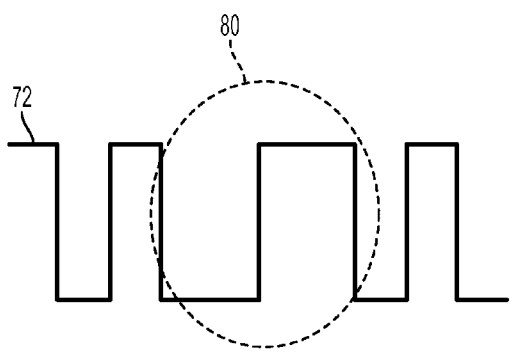
FIG. 19 is a schematic of an A/F modulation sequence including a single, double-wide altered pulse having a first rich portion and a second lean portion.
Figure 20:
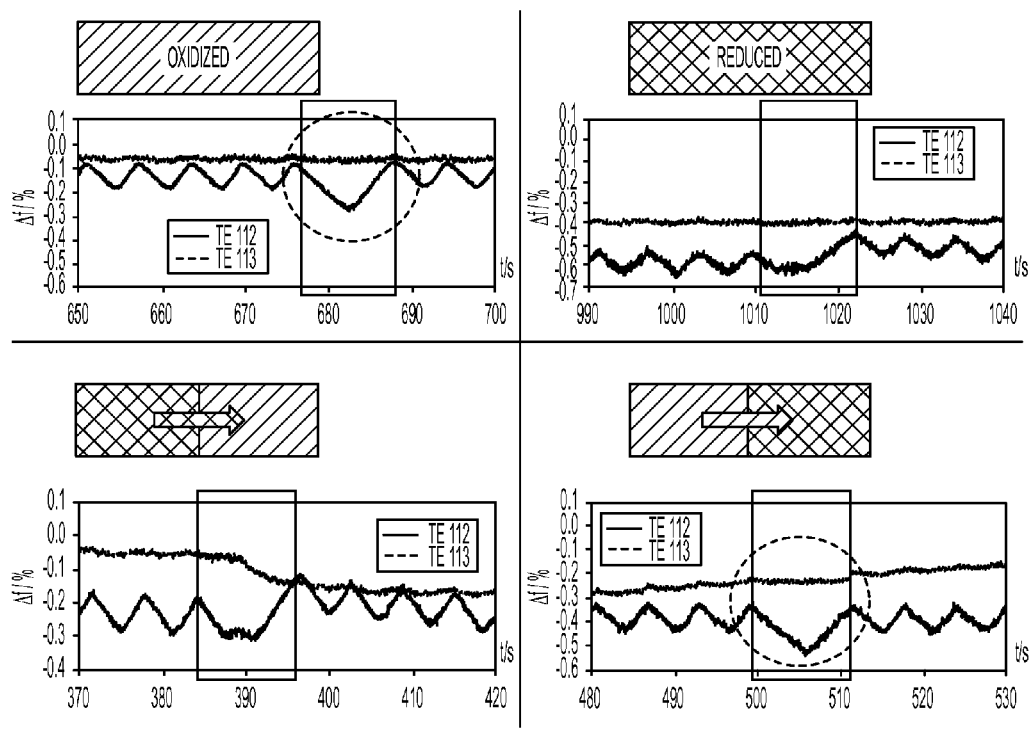
FIG. 20 is an example of a plot showing the resonant mode responses during the sequence in FIG. 19 for two resonant modes for each of the four oxidation states shown in FIG. 16.
Figure 21:
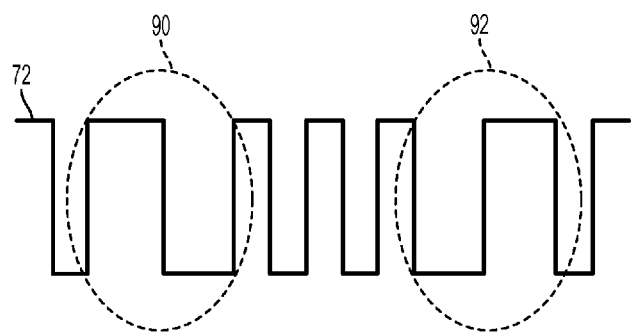
FIG. 21 is a schematic of an A/F modulation sequence including two, double-wide altered pulses, the first starting lean and the second starting rich.
Figure 22:
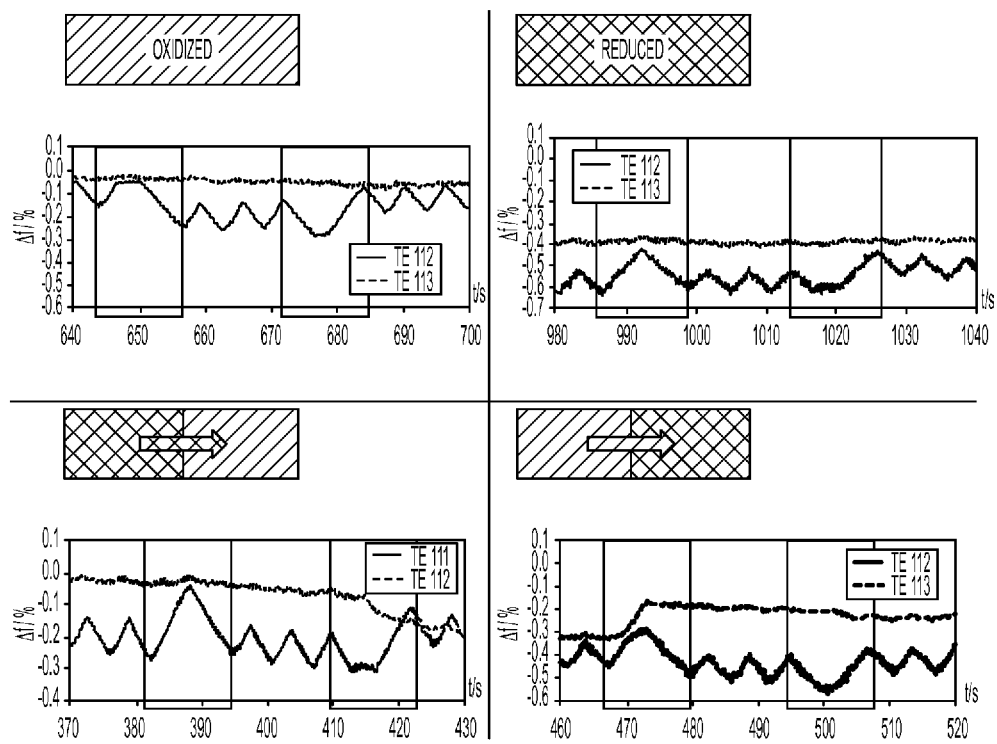
FIG. 22 is an example of a plot showing the resonant mode responses during the sequence in FIG. 21 for two resonant modes for each of the four oxidation states shown in FIG. 16.

FIGS. 19 and 20 show similar RF responses (FIG. 20) for the four cases, but for the insertion of a single, double-wide A/F pulse 80 which starts first rich (for 2T) then is lean for (2T) (FIG. 19). For this pulse sequence, cases #2 and #3 give unique responses, whereas states #1 and #4 give similar responses. With reference to FIGS. 21 and 22, a technique has been discovered in order to generate unique responses to all four cases. As shown in FIG. 21, two single, double-wide A/F pulses may be placed in a symmetric, uniform A/F modulation sequence. In the embodiment shown, the first double wide pulse 90 starts lean and the second 92 starts rich. However, the order may be reversed such that the first starts rich and the second starts lean. As shown in FIG. 22, all four cases can be uniquely identified using this method.

While the disclosed technique is described above as including a single, double-wide air/fuel modulation pulse into an A/F modulation stream for the purpose of determining the oxidation state of the catalyst, other unique or altered pulses may be included. In one embodiment, the unique pulse may have any pulse width that is different than the original, scheduled, or uniform pulse sequence. For example, if the uniform pulse width is T, then the unique or altered pulse width may be ⅓T, ½T, 2T, 3T, 4T, etc. In another embodiment, the unique or altered pulse may have the same width/duration as the other pulses, but have a different amplitude. For example, a single $\lambda=1\pm2\Delta$ pulse may be inserted into a $\lambda=1\pm\Delta$ modulation sequence, with all lean and rich pulses being of the same duration (e.g., T).

Similar to changing the pulse width, other amplitude variations may also be used, such as ⅓Δ, ½Δ, 3Δ, 4Δ, etc.

In addition, if there are two, opposite altered pulses introduced into the modulation sequence, they do not have to be mirror images. If the first altered pulse has a width of 2T and begins lean, the second altered pulse that begins rich need not also have a width of 2T. For example, the first altered pulse may have a width of 2T and the second altered pulse may have a width of 3T, 4T, or others. Similarly, if the first altered pulse has an amplitude of $\lambda=1\pm2\Delta$ and begins lean, the second altered pulse that begins rich need not also have an amplitude of $\lambda=1\pm2\Delta$. For example, the first altered pulse may have an amplitude of $\lambda=1\pm2\Delta$ and the second altered pulse may have an amplitude of $\lambda=1\pm3\Delta$, 4Δ, or others. In at least one embodiment, the λ may still average to 1 with the changes to the pulse width and/or amplitude. In one embodiment, each unique or altered pulse may be symmetrical (e.g., if the width is 2T then it is 2T for lean and 2T for rich, and vice versa). In another embodiment, the altered pulse(s) may be asymmetrical. For example, in reference to FIGS. 13 and 14 the initial lean portion of the first pulse may have a width of T and the width of the rich portion which follows it may have a width of 1/n*T (where n is an integer). This may be followed by a lean width of T and a rich width of (2−1/n)*T.

The disclosed technique and method of inserting at least one unique or altered pulse into a modulation sequence may take advantage of two effects. First, that different RF resonant modes having different sensitivities across the length of the catalyst. Second, by purposefully varying the A/F modulation in a certain way, some of the reactions move from the front of the catalyst to regions deeper in the axial profile where the sensitivities of the RF modes are different. Accordingly, the relative variation of the modes with respect to each other during the perturbation in the A/F modulations can be detected and analyzed. The relative change in frequency of a mode when compared to other modes, as the A/F ratio is modulated, may be used to determine the axial oxidation profile of the catalyst. For example, by monitoring the frequencies of the $TE_{112}$ and $TE_{113}$ modes during A/F modulations, it can be analyzed whether each increase, decrease, or stay the same, and their behaviors can be compared.

The relative changes, as opposed to the actual value of the frequencies, (which could be used in a relationship between the frequency value and oxygen storage) may be used in disclosed method or technique to determine the oxidation state of the TWC. The disclosed method/technique may overcome the issues caused by temperature, small geometry changes, and/or aging—all which can affect the accuracy of a correlation of the resonant frequency value and the oxygen storage. Once the oxidation state of the catalyst has been determined, the A/F ratio may be altered to correct an unwanted bias, if one exits.

Figure 23:
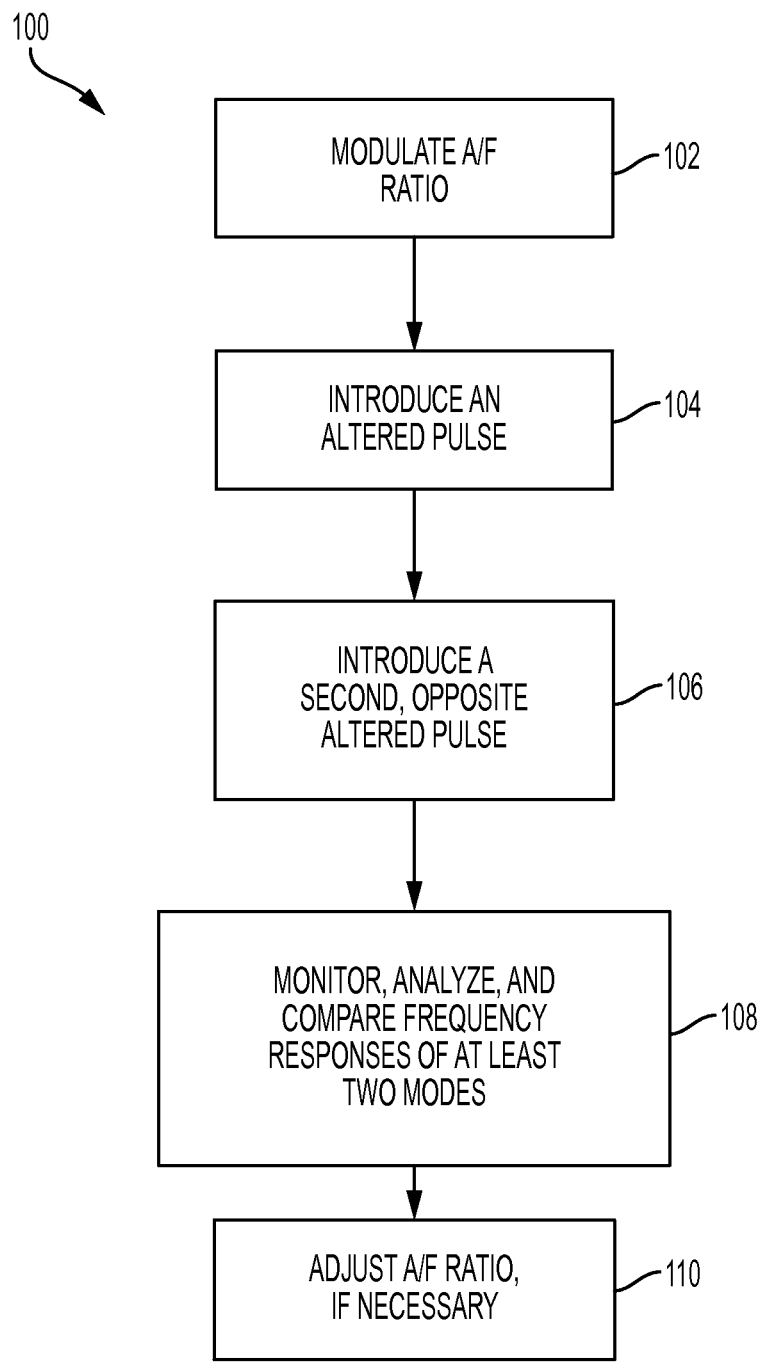
FIG. 23 is a flowchart for a method of comparing resonant mode frequency responses to determine an oxidation state of a catalyst, according to an embodiment.

An example of a flowchart 100 for performing the disclosed method is shown in FIG. 23. In step 102, an air-fuel (A/F) ratio may be provided to an internal combustion engine (ICE), for example a vehicle engine. The A/F ratio may have an average value at or near the stoichiometric mixture, which may be referred to as $\lambda=1.0$, where rich mixtures are $\lambda<1.0$ and lean mixtures are $\lambda>1.0$. The A/F ratio may be modulated such that it alternates being above and below $\lambda=1.0$. The modulations may be in the form of pulses, wherein the A/F ratio is above $\lambda=1.0$ for a certain period of time (pulse width) and then below $\lambda=1.0$ for a certain period of time. There may be a pulse or modulation sequence, in which a plurality of pulses occur one after another. The sequence may have a uniform or regular pulse width and/or amplitude (e.g., the $\Delta$ above and below $\lambda=1.0$). As described above, the width of the regular pulses may be T and the amplitude may be $\lambda=1\pm\Delta$.

In step 104, a pulse may be inserted into the modulation sequence (e.g., regular or uniform sequence) that is altered or unique compared to the regular pulses. The altered pulse may have a width and/or amplitude that differs from the regular pulses. In one embodiment, the regular pulses may have a width of T and the altered pulse may have a pulse width that is less than or greater than T. The pulse width of the altered pulse may be a multiple of T, such as 2T, 3T, 4T, or more. However, the pulse width may by greater than T by any amount, such as 1.5T or 2.5T or T+1, T+2, etc. In another embodiment, the regular pulses may have an amplitude of $\lambda=1\pm\Delta$ and the altered pulse may have an amplitude that is less than or greater than $\lambda=1\pm\Delta$. The pulse amplitude of the altered pulse may be a multiple of $\Delta$, such as 2$\Delta$, 3$\Delta$, 4$\Delta$, or others. However, the pulse amplitude may by greater than $\Delta$ by any amount, such as 1.5$\Delta$ or 2.5$\Delta$ or $\Delta$+1, $\Delta$+2, etc. The unique or altered pulse may also include both a change in pulse width and in pulse amplitude. The unique or altered pulse may begin lean or rich (e.g., be rich first and then lean or lean first and then rich).

In step 106, a second altered or unique pulse may be inserted into the modulation sequence. While a second altered pulse may provide more certainty regarding the state of the catalyst, step 106 may be omitted in some embodiments. In one embodiment, the second altered pulse may be the opposite or mirror image of the first altered pulse. For example, if the first altered pulse began lean and had a pulse width of 2T, the second altered pulse may also have a pulse width of 2T but may begin rich. An example of this is shown in FIG. 21. The second altered pulse need not be a mirror or opposite of the first altered pulse. However, the second pulse may begin with the opposite A/F mixture than the first pulse (e.g., if the first pulse began rich, then the second may begin lean, or vice versa). For example, if the first altered pulse began lean and had a pulse width of 2T, then the second altered pulse may being rich and have a pulse width of 3T. While the above is described with reference to changes in pulse width, the same may apply for pulse amplitude (or a combination of both). In at least one embodiment, the overall average A/F ratio may remain unchanged as a result of the altered pulses. For example, each pulse may be symmetric such that it is rich and lean for the same width and amplitude.

The first and second altered pulses may be performed within the same modulation sequence or they may be performed during different sequences (e.g., during sequences separated by a turning off of the ICE). If the altered pulses are performed during the same modulation sequence, they may be separated by at least one normal or regular pulse (e.g., a pulse of width T and amplitude $\lambda=1\pm\Delta$). A separation of multiple regular pulses may make the comparison between frequencies easier and distinctions between oxidation states more clear. In addition, while the flowchart 100 shows a first and a second altered pulse, additional altered pulses may also be introduced (e.g., a third, fourth, fifth, or more altered pulses). Additional altered pulses may be repeats of earlier altered pulses. For example, there may be four altered pulses, which are two sets of the first and second altered pulses. Alternatively, the additional altered pulses may be different than the first and second. The number of additional pulses may be even, such that the altered pulses are in pairs. This may allow for one pulse in each pair to begin lean and the other to being rich. For example, if the first and second altered pulses used a wider pulse of 2T, a third and fourth altered pulse may have a pulse of 3T. Additional pulses may allow the analysis (described in more detail below) to be confirmed (e.g., if the same pulses are repeated) or to be more accurate or robust (e.g., if the additional pulses are different).

In step 108, the frequencies of the resonant modes may be monitored, analyzed, and compared, at least during the occurrence of the altered pulses and a plurality of normal or regular pulses. The resonant modes may be transverse electric resonant modes (TE modes), which may be referred to as $TE_{lmn}$. The method/technique has been disclosed with reference to $T_{11n}$ modes, with the last factor "n" being the number of half wavelengths along the axial dimension of the resonator cavity (as described above). However, other resonant modes may also be used, such as $T_{211}$ or $T_{212}$. The examples disclosed have focused on comparing the $T_{112}$ and $T_{113}$ modes. Again, however, other $T_{11n}$ modes may be used, such as $T_{111}$ or $T_{114}$.

The resonant modes that are chosen to be monitored and compared may vary depending on the length of the TWC and/or resonant chamber, the expected oxidation state of the TWC, or other factors. As described above, the modes may become insensitive to changes in oxidation state at or near the "zero-points" of the electric field. Accordingly, modes may be chosen such that at least one mode is insensitive and at least one mode is sensitive over at least a portion of the catalyst to be analyzed. While the disclosed examples have compared and analyzed two modes, more modes may be analyzed—such as 3, 4, or more modes. For example, modes $T_{111}$, $T_{112}$ and $T_{113}$ may be compared and analyzed. A greater number of modes analyzed may provide a more accurate indication of where in the catalyst reactions are occurring For example in FIG. 15, if the $TE_{111}$ were included along with the $TE_{112}$ and $TE_{113}$ then there may be more confidence in the location of the reaction during the portion labeled 64 as the $TE_{112}$ would remain flat but the $TE_{111}$ and $TE_{113}$ modes would not. Another example may be if the $TE_{115}$ were also included (see, e.g., FIG. 7). If, for example, during portion 64 the $TE_{115}$ was flat whereas the other modes were not, then the reaction zone during 64 was in one of two regions, around either 12 cm or 17 cm in FIG. 7. Analysis of the data of the other modes during the interval 64 may allow a determination of which region. For example, if 64 were long enough, then a decreasing slope for the $TE_{112}$ response and increasing slope for the $TE_{113}$ would indicate the reaction during 64 was near 12 cm. An increasing $TE_{112}$ slope and decreasing $TE_{113}$ slope would indicate the reaction during 64 was instead near 17 cm.

A comparison and analysis of the frequency responses of the at least two modes may allow for a determination of the oxidation state of the catalyst. The comparison may allow for a qualitative determination of whether the catalyst is fully oxidized, fully reduced, has a rich bias on an oxidized catalyst, or has a lean bias on a reduced catalyst. Based on the modes compared, the location of the reactions may also be determined to within a certain distance range (e.g., based on the sensitive regions, such as shown in FIG. 7(C)).

In step 110, the A/F ratio may be adjusted based on the analysis of the frequency response(s). If only a single altered pulse is introduced into the modulation sequence, then only certain oxidation states may be known with certainty. For example, as shown in FIGS. 17 and 18, if a lean then rich pulse is introduced, then it may be determined if the catalyst is fully oxidized or reduced with a lean bias. If a rich then lean pulse is introduced, then it may be determined if the catalyst is fully reduced or oxidized with a rich bias.

However, if two or more pulses are performed, then any of these four cases may be determined.

Based on the analysis of the resonant frequency response (s), the A/F ratio may be adjusted if the determined case is not the intended one (or for any other reason). The A/F ratio may be adjusted to correct or create/increase a bias, such as a lean or rich bias. For example, if a lean bias is detected and it is desired to correct, reduce, or eliminate it, several non-limiting actions may be taken (alone or in combination). The time of the lean cycle may be reduced (e.g., pulse width less than T) and/or the rich cycle time may be increased (e.g., pulse width greater than T). More fuel may be injected during the rich cycle (e.g., increase Δ during rich cycle) and/or more fuel may be injected during the lean cycle (e.g., decrease Δ during lean cycle). Any combination of these changes may also be made.

If there is a rich bias and it is desired to correct, reduce, or eliminate it, the opposite actions may be taken. The time of the lean cycle may be increased (e.g., pulse width greater than T) and/or the rich cycle time may be reduced (e.g., pulse width less than T). Less fuel may be injected during the rich cycle (e.g., decrease Δ during rich cycle) and/or less fuel may be injected during the lean cycle (e.g., decrease Δ during lean cycle). Any combination of these changes may also be made.

If there is no bias and a bias is desired, or if there is a bias and it is desired to be increased, then similar actions may be taken. For example, to increase a rich bias, similar actions may be taken as if there is an unwanted lean bias (e.g., reduce lean cycle time, increase rich cycle time, inject more fuel during the rich cycle, and/or inject more fuel during the lean cycle). To increase a lean bias, similar actions may be taken as if there is an unwanted rich bias (e.g., increase time of the lean cycle, reduce time of the rich cycle, inject less fuel during the rich cycle, and/or inject less fuel during the lean cycle).

The disclosed methods/techniques may be performed using a system like that shown in FIGS. 2 and 4 (or a combination thereof), although those skilled in the art will recognize that variations may be made or other systems may be used, based on the present disclosure. The system may include upstream and downstream oxygen sensors (from the TWC). The catalyst (e.g., TWC) may be located within a resonant chamber, which may be cylindrical, box-shaped (e.g., rectangular-prism) or substantially cylindrical or box-shaped. Of course, other chamber shapes may also be used. Screens may be placed at each end of the chamber to allow the gases to flow through but contain and reflect electromagnetic energy. The screens may be formed of any suitable material and have any suitable form to perform this function, such as a metal mesh screen. One or more antennas may be disposed within the chamber. The antenna(s) may be an electrically isolated metal antenna. If there is one antenna, it may be upstream or downstream of the TWC. If there are multiple antennas, at least one may be located upstream and at least one located downstream of the TWC. The antenna(s) may be configured to emit and/or detect radio frequency electrical signals (e.g., 3 kHz to 300 GHz). The antenna(s) may be connected to a network analyzer, which may control the RF signals emitted and detect the RF signals reflected. The network analyzer may be configured or programmed to vary the frequency of the antenna(s). The network analyzer may include a processor and memory (e.g., transient and/or non-transient) and may be programmed to analyze the reflected RF signals. Alternatively, the network analyzer may be connected to another computer including a processor and memory that may be programmed to analyze the reflected RF signals or the data corresponding to the signals may be stored for later analysis by such a computer.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   introducing radio-frequency signals into a resonant chamber including a catalyst;
   modulating an air-fuel ratio of an engine upstream of the catalyst to generate a sequence of uniform pulses and at least a first altered pulse that differs from the uniform pulses; and
   comparing a frequency response of two or more resonant modes of the radio-frequency signals during the sequence to determine an oxidation state of the catalyst.

2. The method of claim 1, wherein the sequence includes two altered pulses.

3. The method of claim 2, wherein one altered pulse begins with a lean portion and another altered pulse begins with a rich portion.

4. The method of claim 1, wherein the first altered pulse has a pulse width that is greater than a pulse width of the uniform pulses.

5. The method of claim 1, wherein the first altered pulse has a pulse amplitude that is greater than a pulse amplitude of the uniform pulses.

6. The method of claim 1, wherein an average air-fuel ratio of the altered pulse is the same as an average air-fuel ratio of the uniform pulses.

7. The method of claim 1, wherein the two or more resonant modes are chosen from a group consisting of $T_{111}$, $T_{112}$, $T_{113}$, $T_{114}$, and $T_{115}$.

8. The method of claim 1, wherein the comparing step includes comparing a frequency response of at least three resonant modes during the sequence.

9. The method of claim 1, wherein determining an oxidation state of the catalyst includes determining if the catalyst is fully oxidized, fully reduced, oxidized with a rich bias, or reduced with a lean bias.

10. The method of claim 1, further comprising adjusting the air-fuel ratio based on the comparing step.

11. A method comprising:
    introducing radio-frequency signals into a resonant chamber including a catalyst;
    inserting an altered pulse into a sequence of uniform pulses of an air-fuel ratio of an engine upstream of the catalyst;
    comparing a frequency response of two or more resonant modes of the radio-frequency signals during the sequence to determine an oxidation state of the catalyst; and
    adjusting the air-fuel ratio based on the comparing step.

12. The method of claim 11, wherein if the comparing step determines that there is a lean bias in the catalyst, the adjusting step includes one or more of reducing a lean portion time in the sequence, increasing a rich portion time in the sequence, injecting more fuel during a rich portion in the sequence, or injecting more fuel during a lean portion in the sequence.

13. The method of claim 11, wherein if the comparing step determines that there is a rich bias in the catalyst, the adjusting step includes one or more of increasing a lean portion time in the sequence, decreasing a rich portion time in the sequence, injecting less fuel during a rich portion in the sequence, or injecting less fuel during a lean portion in the sequence.

14. The method of claim 11, wherein the inserting step includes inserting two altered pulses into the sequence.

15. The method of claim 14, wherein one altered pulse begins with a lean portion and another altered pulse begins with a rich portion.

16. The method of claim 11, wherein the altered pulse has a pulse width that is greater than a pulse width of the uniform pulses or a pulse amplitude that is greater than a pulse amplitude of the uniform pulses.

17. A method comprising:
   introducing radio-frequency signals into a resonant chamber including a catalyst to generate multiple resonant modes in the resonant chamber;
   modulating an engine air-fuel ratio upstream of the resonant chamber to generate a sequence of pulses including multiple uniform pulses and two altered pulses in the resonant chamber; and
   measuring and comparing a frequency response of two or more of the multiple resonant modes to determine an oxidation state of the catalyst.

18. The method of claim 17, wherein the two altered pulses have a pulse width that is greater than a pulse width of the uniform pulses or a pulse amplitude that is greater than a pulse amplitude of the uniform pulses.

19. The method of claim 17, wherein the modulating step includes generating three or more altered pulses in the sequence.

20. The method of claim 17, wherein one altered pulse begins with a lean portion and another altered pulse begins with a rich portion.

* * * * *